United States Patent [19]

Cook et al.

[11] Patent Number: 4,931,970
[45] Date of Patent: Jun. 5, 1990

[54] APPARATUS FOR DETERMINING IF THERE IS A LOSS OF DATA DURING A SHIFT OPERATION

[75] Inventors: Peter W. Cook, Mount Kisco, N.Y.; Robert K. Montoye, Austin, Tex.

[73] Assignee: International BusinessMAchines Corporation, Armonk, N.Y.

[21] Appl. No.: 297,639

[22] Filed: Jan. 13, 1989

[51] Int. Cl.[5] .............................................. G06F 7/38
[52] U.S. Cl. ............................................... 364/715.08
[58] Field of Search ................ 364/715.08, 736.5, 737, 364/738, 739, 740

[56] References Cited

U.S. PATENT DOCUMENTS 4,396,994  8/1983  Kang et al. ................. 364/715.08

Primary Examiner—Gary V. Harkcom
Assistant Examiner—Long T. Nguyen
Attorney, Agent, or Firm—Jack M. Arnold

[57] ABSTRACT

Apparatus for determining if, during the shifting of data there has been a loss of precision due to the loss of one or more data bits due to overflow. A small data field is shifted into a much larger data, field. The width of the switching mechanism used is based on the number of bits in the small data field. Loss of data is determined in part by ORing the control signals utilized to shift the small data field to the large data field.

6 Claims, 15 Drawing Sheets

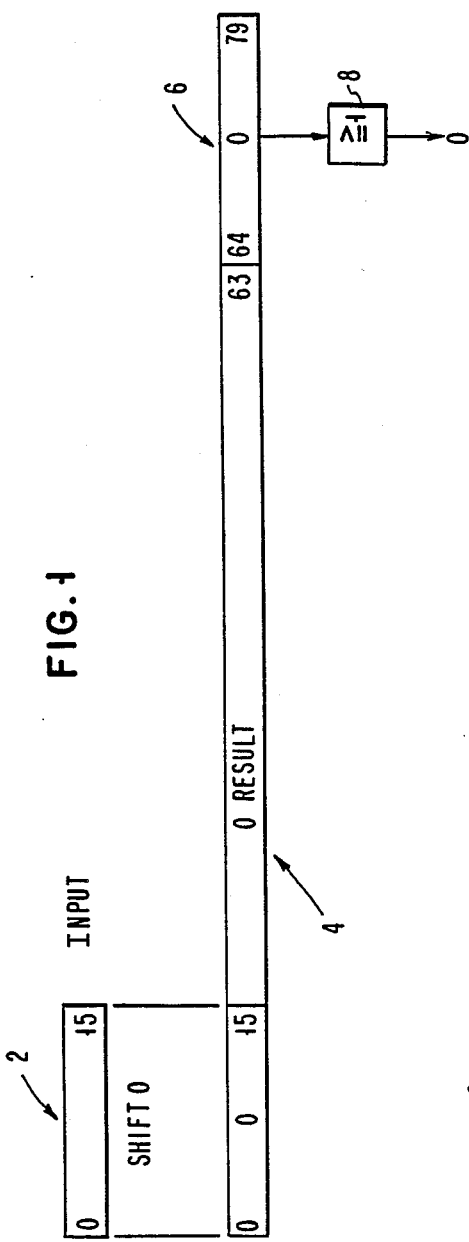
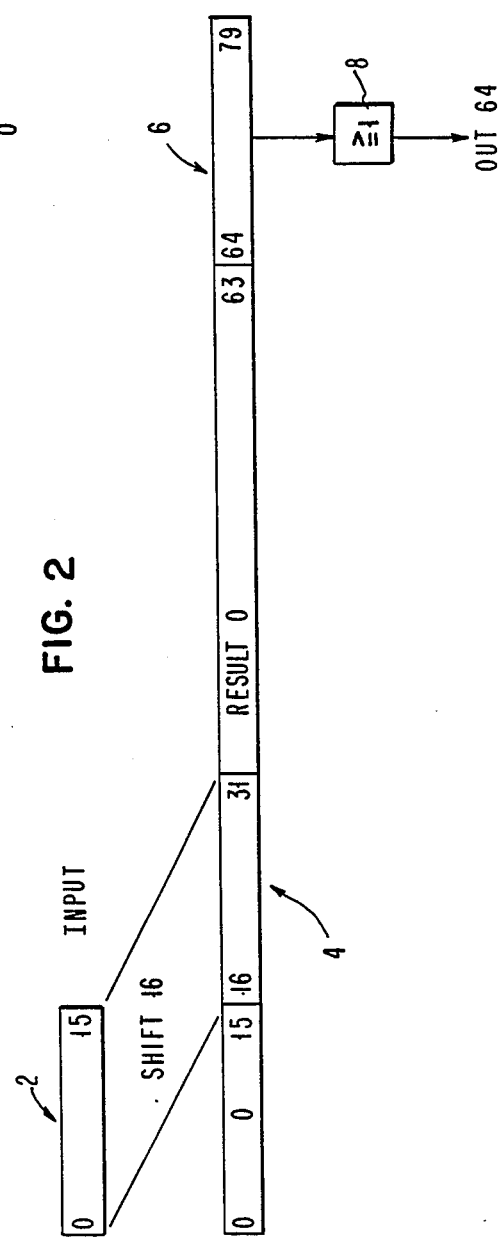
FIG. 1
FIG. 2

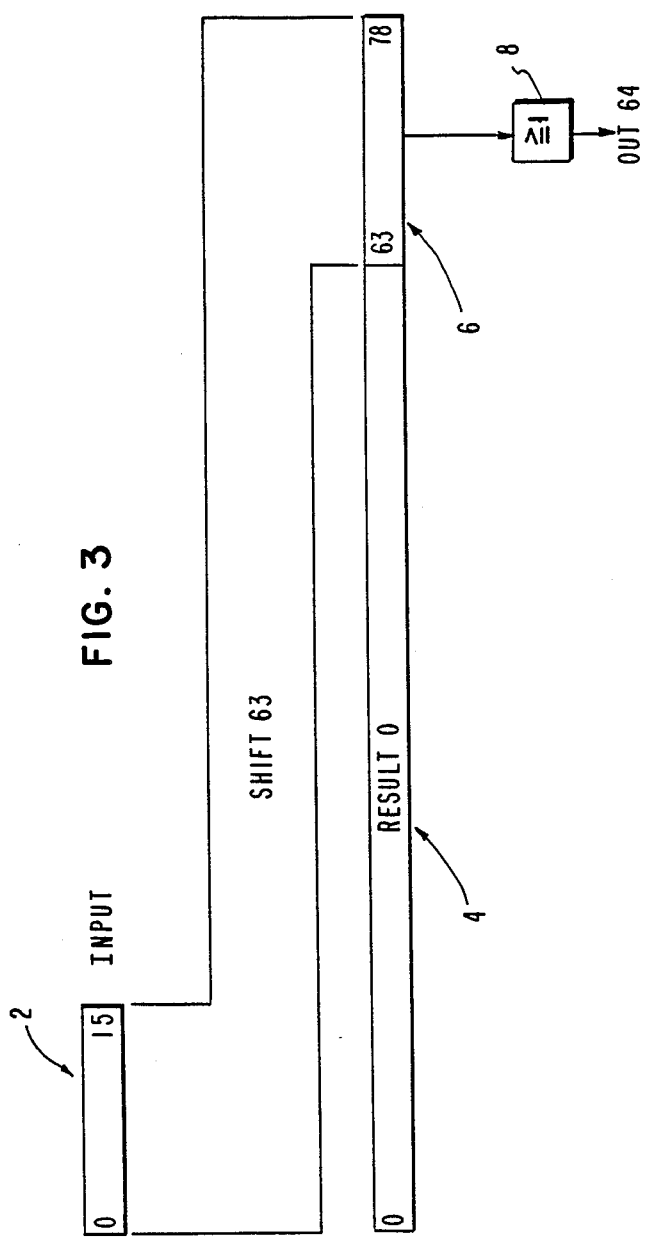

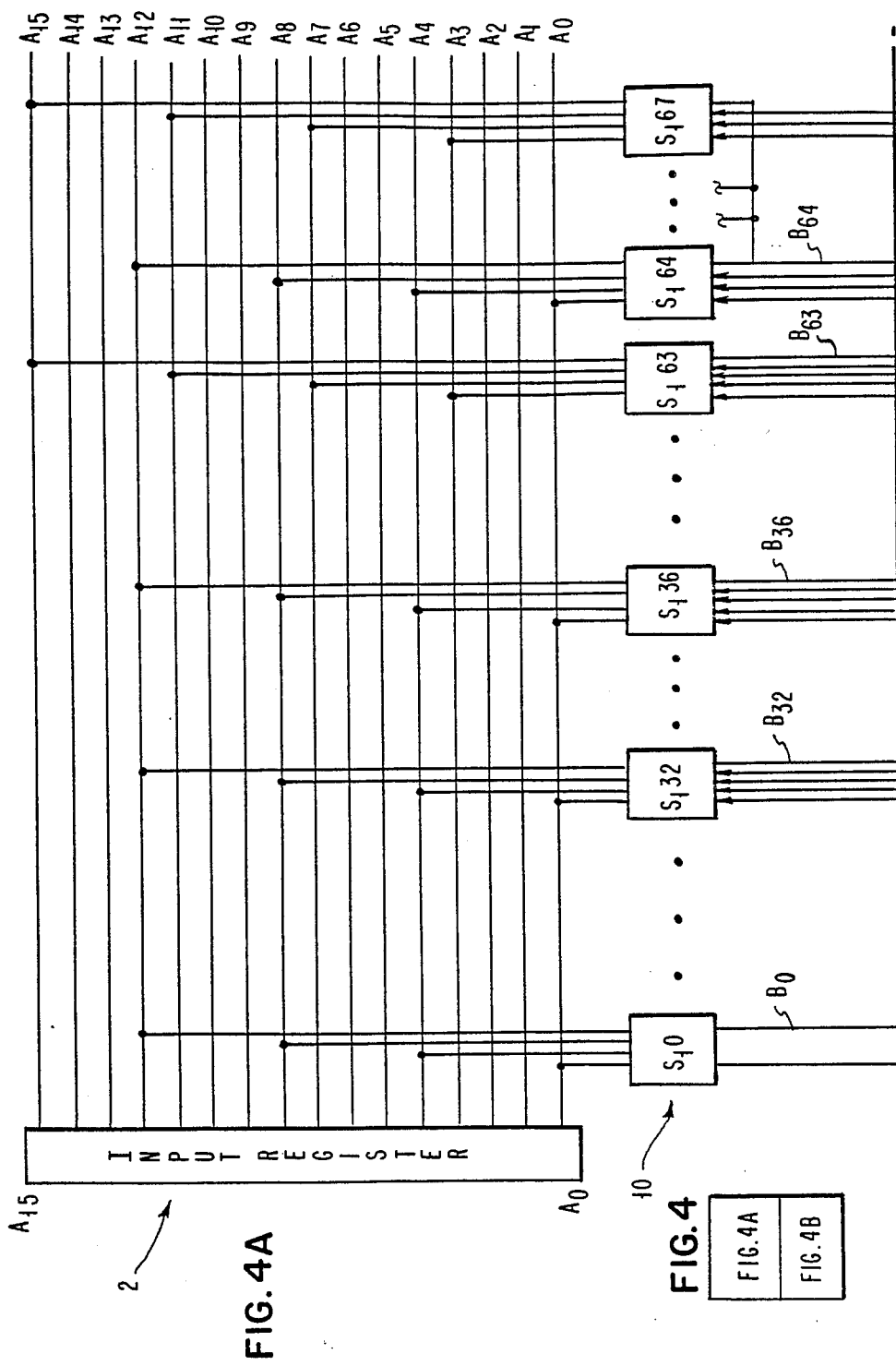

STAGE 1 DECODER

STAGE 2 DECODER

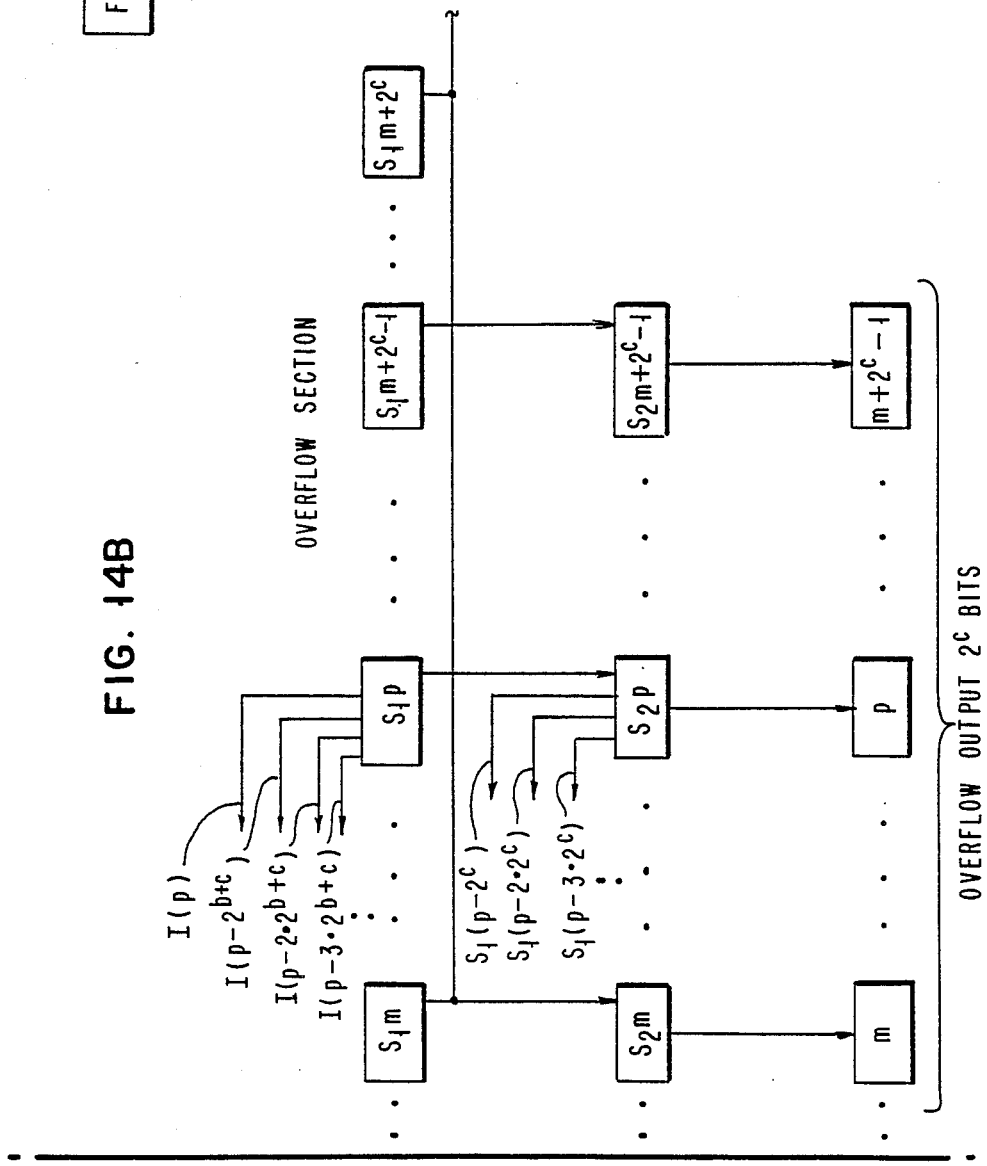

APPARATUS FOR DETERMINING IF THERE IS A LOSS OF DATA DURING A SHIFT OPERATION

The invention is in the field of data processing, and in particular is directed to floating point type of arithmetic operations for determining if there has been a loss of precision due to an overflow of data while shifting.

It is well known in the data processing art to provide data processing systems with means for shifting or rotating (circular shifting) multi-bit binary data. Shifting of data is typically required in performing certain arithmetic operations such as multiplication or division, while rotation of data is typically used in data field manipulation operations such as field extraction or insertion.

Generally, in data field manipulation operations a small data field is shifted into a much larger data field. The width of the multiplexors utilized in such operations is usually based on the shift range, and overflow is determined based on ORing of the data being shifted.

According to the present invention, the width of the multiplexors is based on the number of input data bits rather than the shift range, and overflow is determined by ORing control signals rather than data signals.

OBJECTS OF THE INVENTION

It is an object of the invention to provide an improved data shifting device, including a means of detecting loss of data.

It is a further object of the invention to provide a shifter wherein the width of the switching mechanism used is based on the input data bits rather than the shift range.

It is another object of the invention to provide a shifter wherein loss of data is detected by ORing control signals rather than data signals.

BRIEF DESCRIPTIONS OF THE DRAWINGS

FIG. 1 is a block diagram of the shift apparatus of the invention illustrating a shift of 0;

FIG. 2 is a block diagram of the shift rotate apparatus of the invention illustrating a shift of 16;

FIG. 3 is a block diagram of the invention illustrating a shift of 63;

Figure 4B:
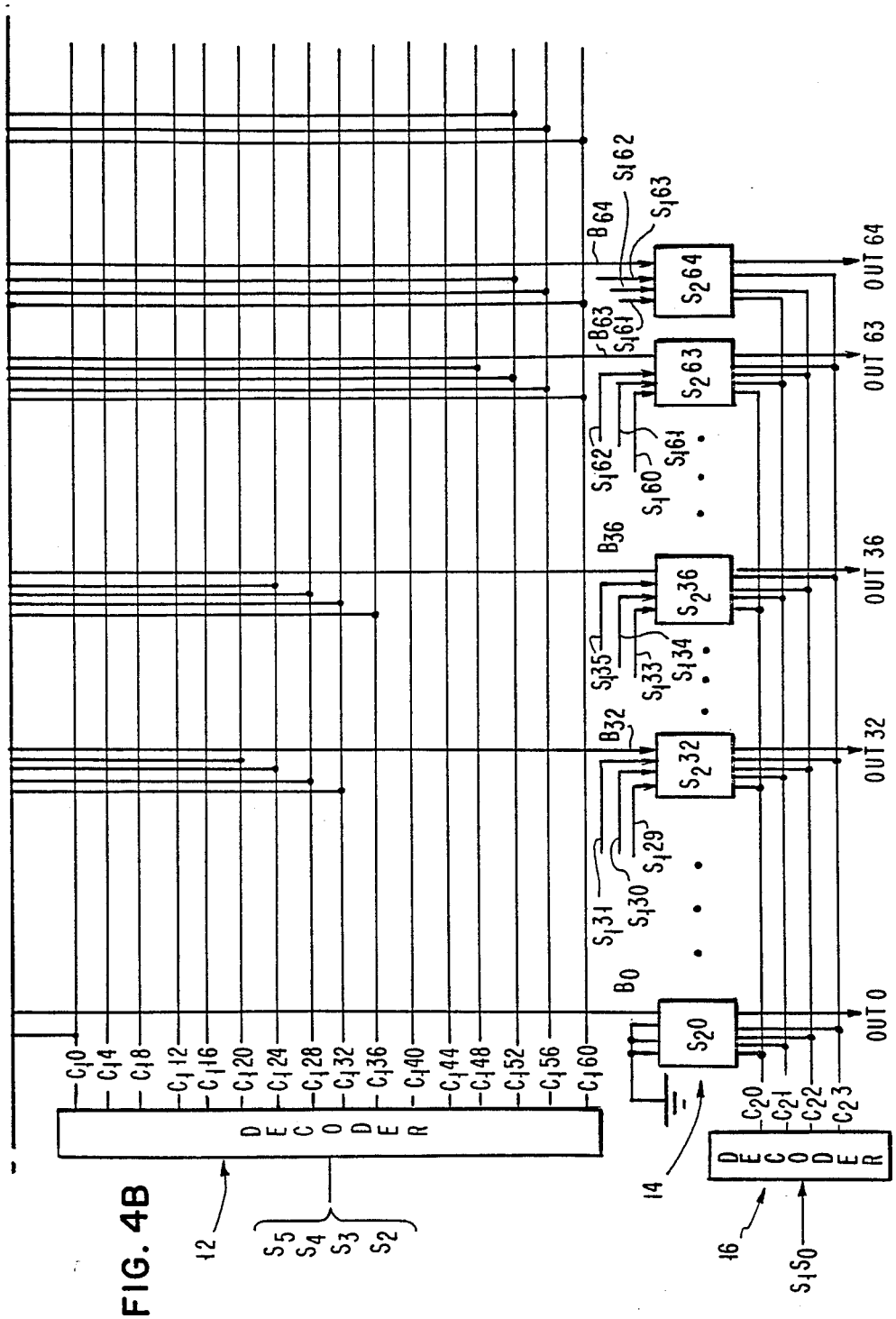
Figure 5:
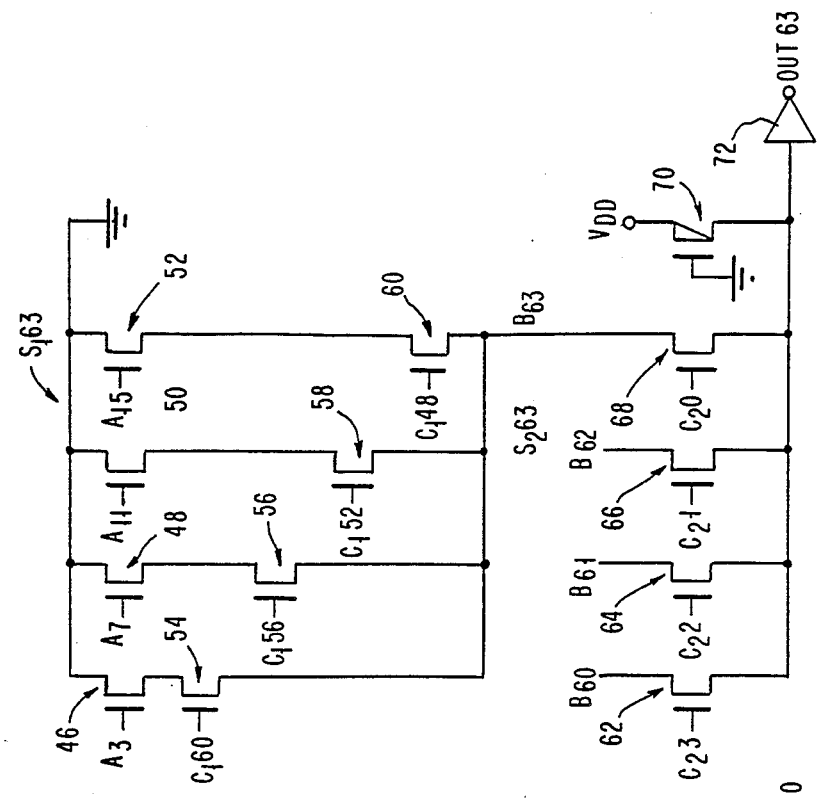
Figure 6:
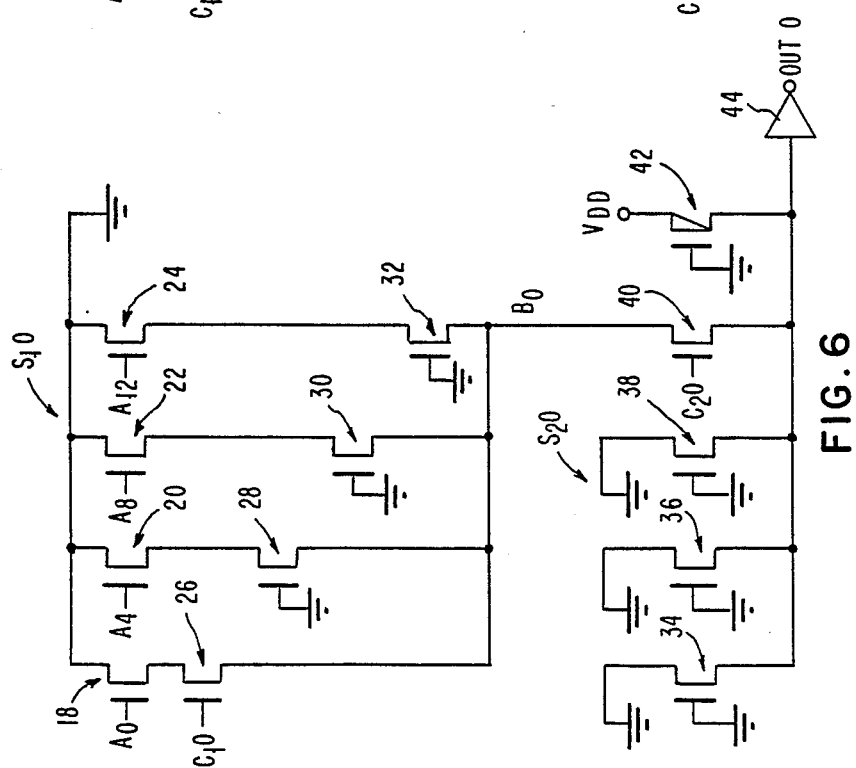
Figure 7:
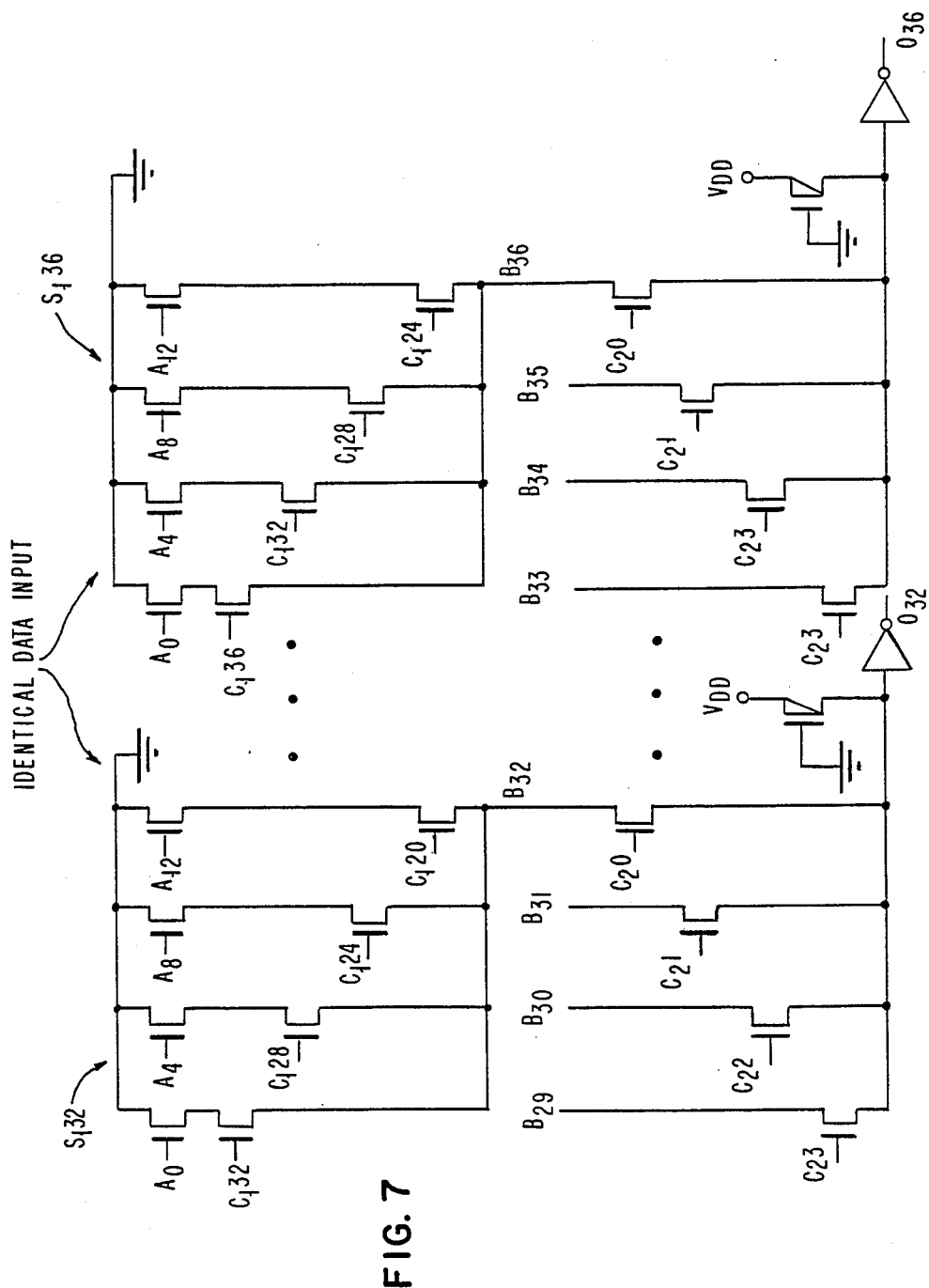
Figure 8:
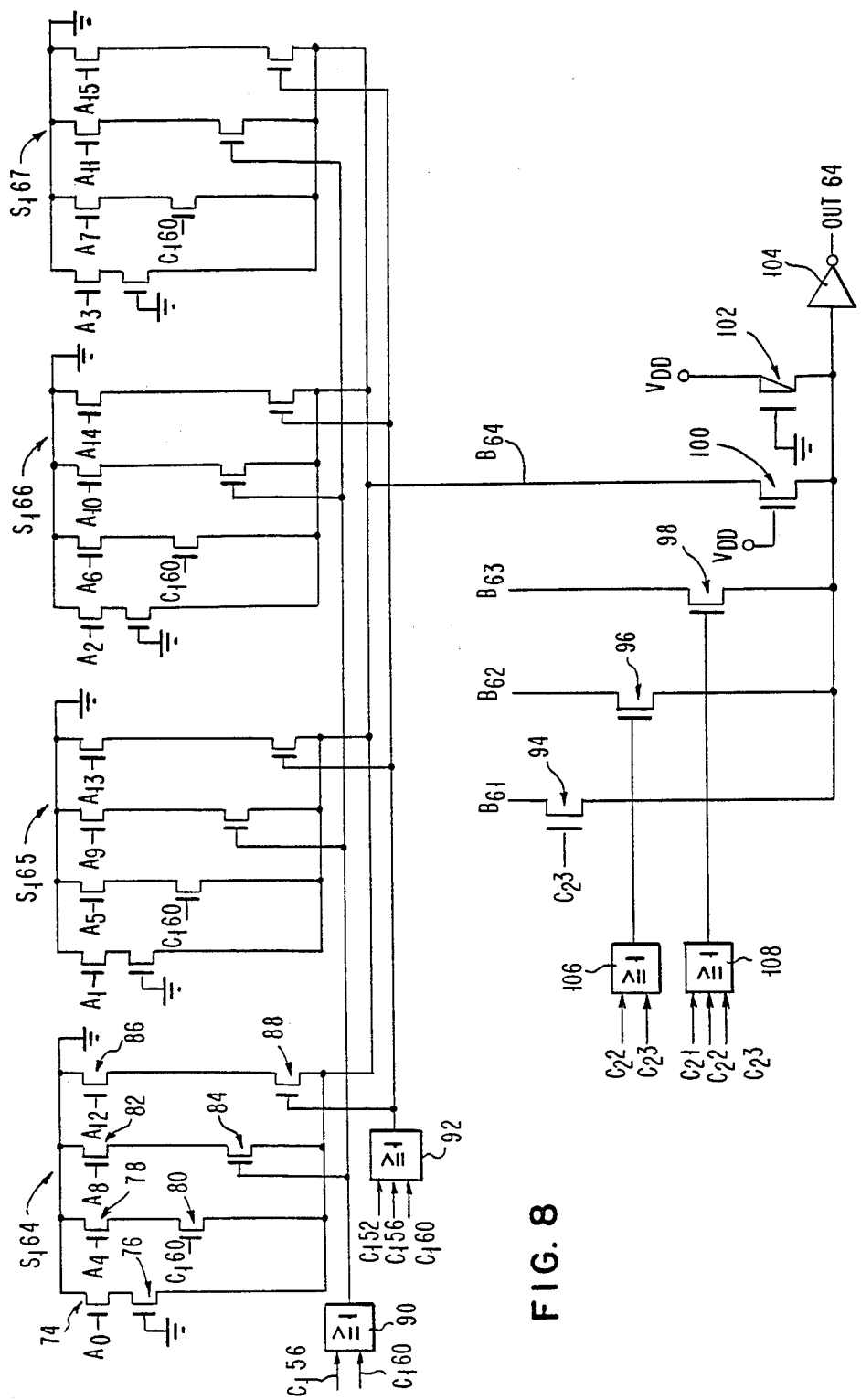
Figure 9:
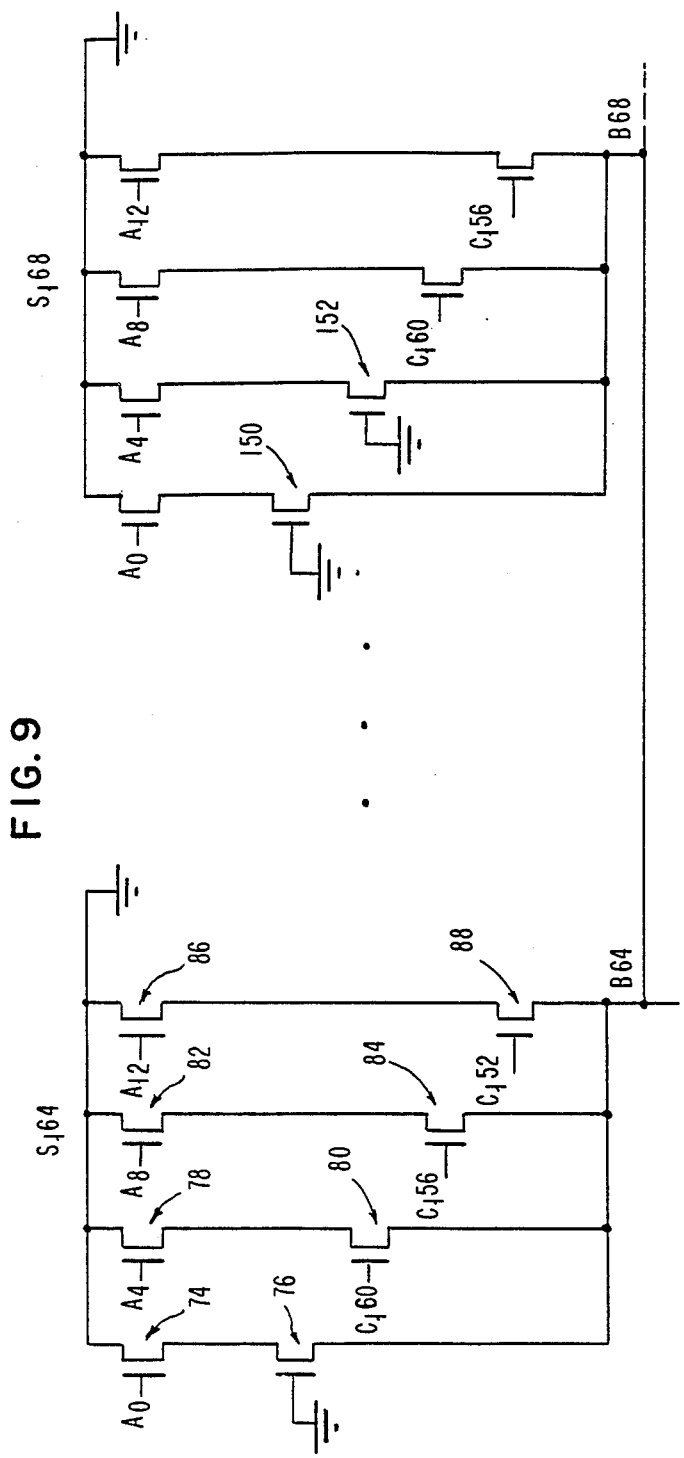
Figure 10:
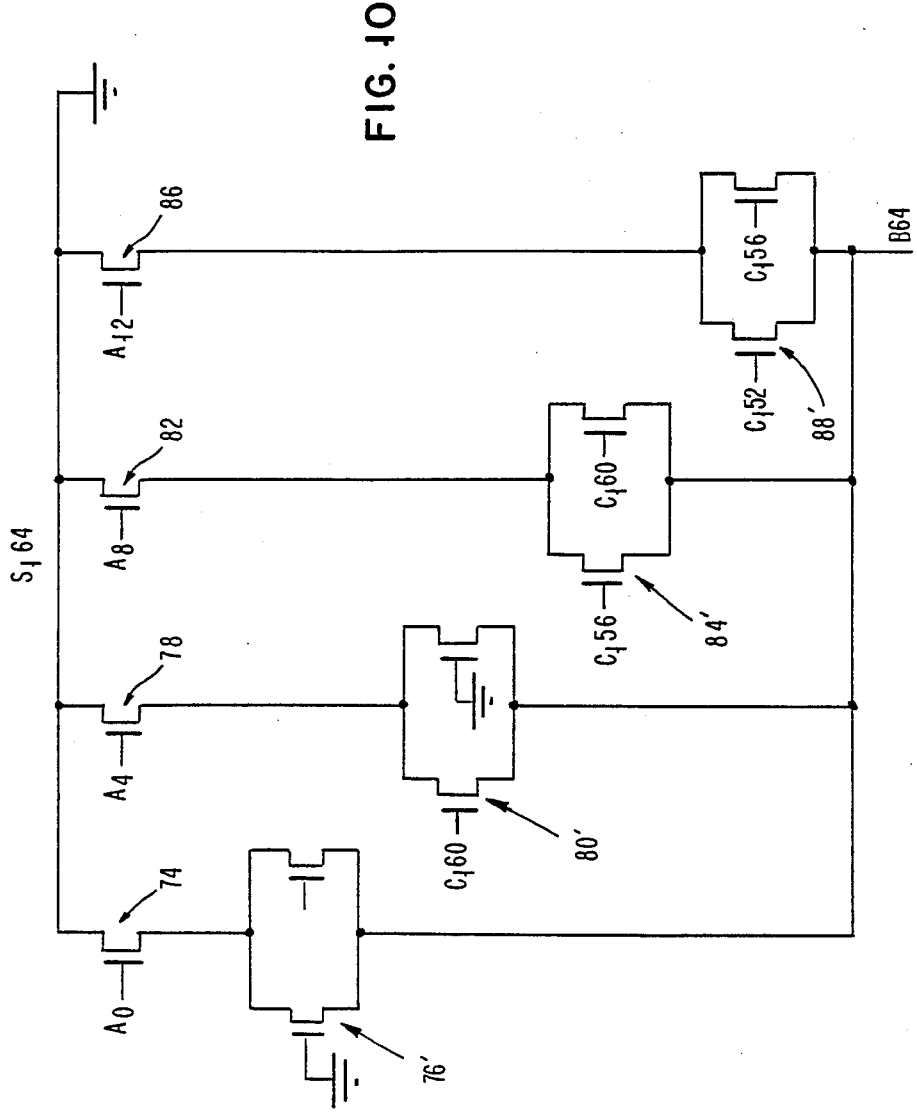
Figure 11:
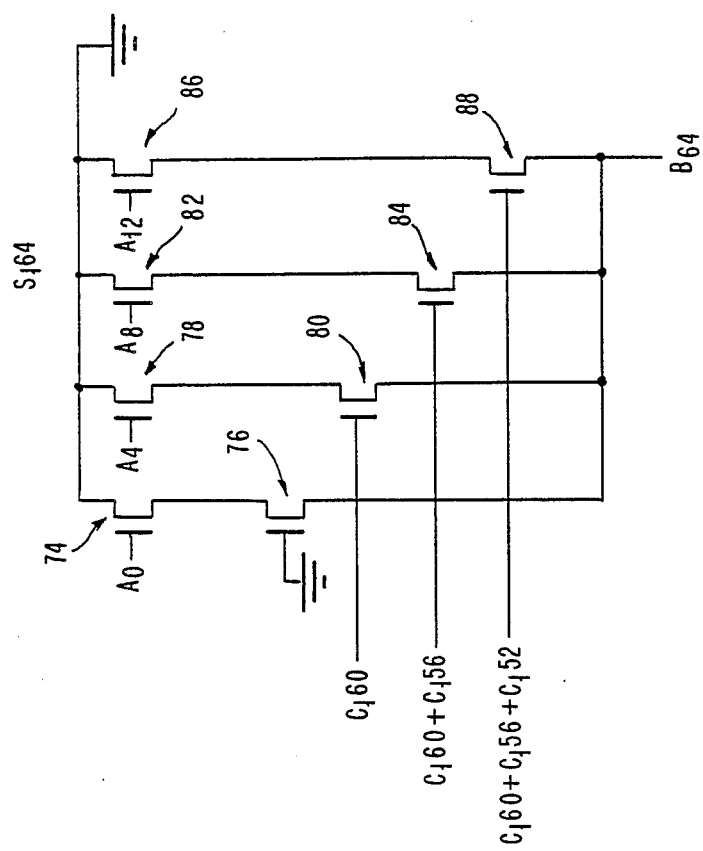
Figure 12:
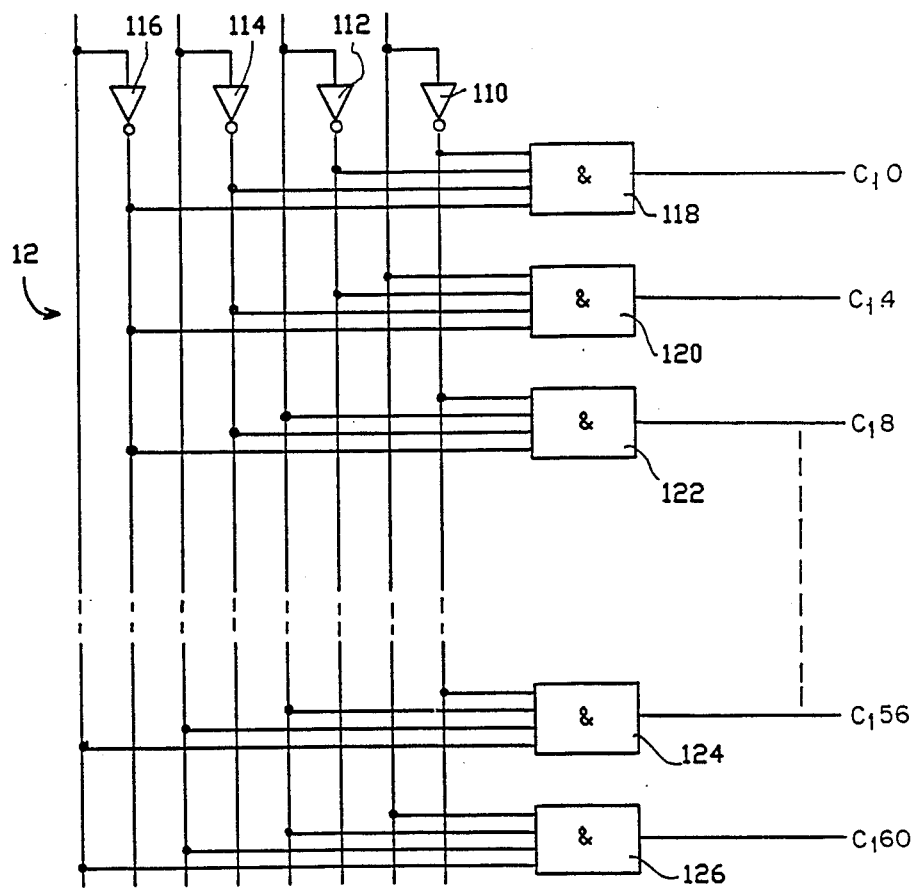
Figure 13:
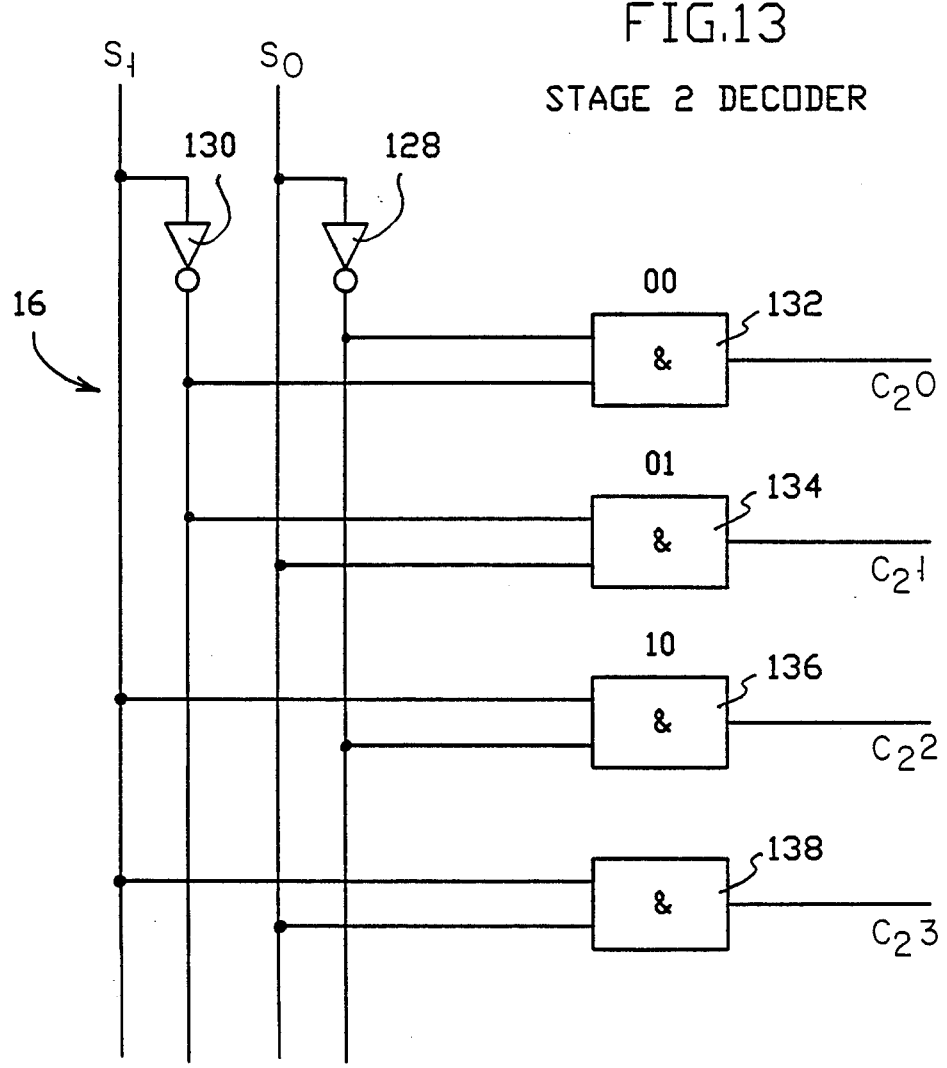
Figure 14A:
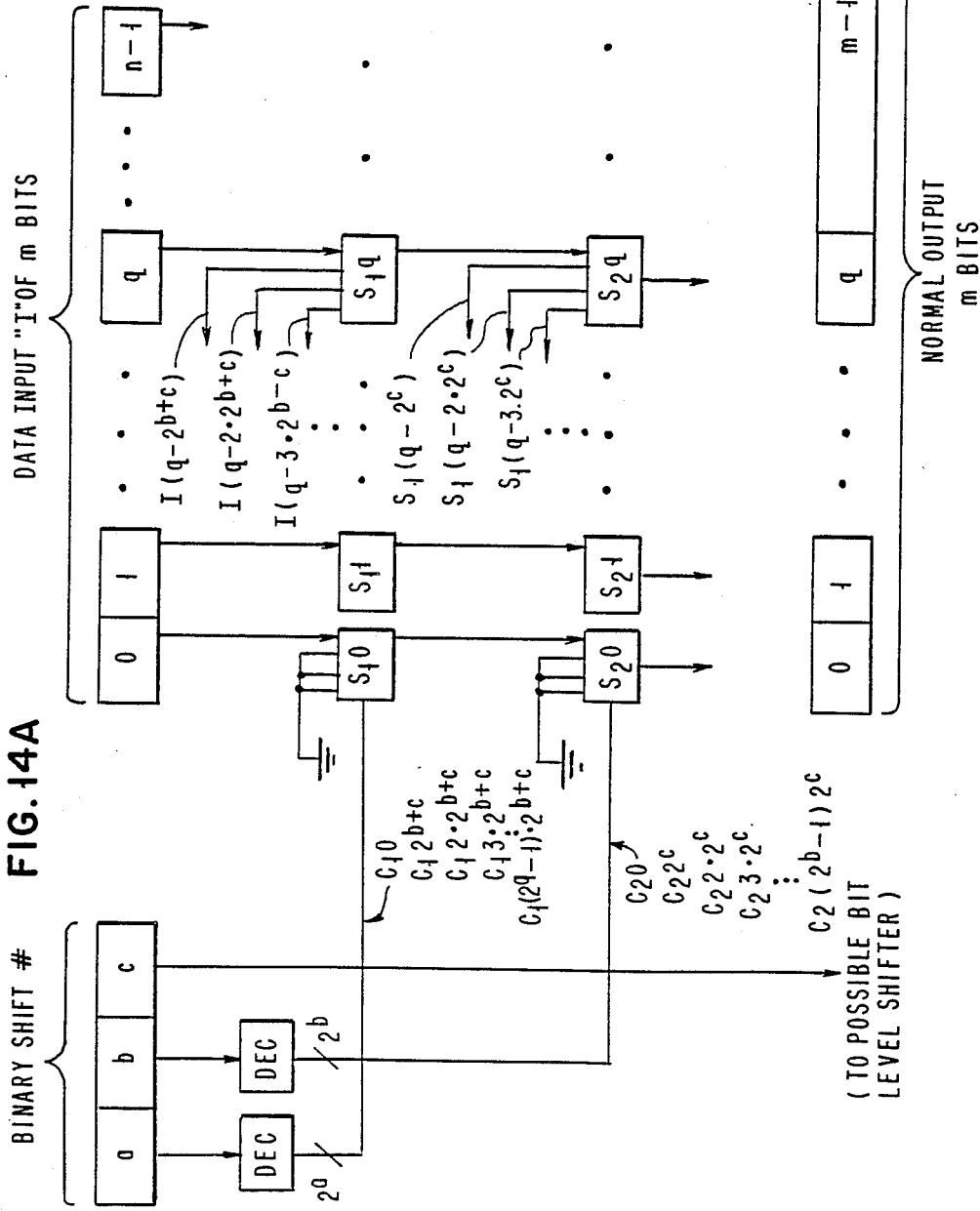

FIGS. 4A and 4B, taken together as shown in FIG. 4, comprise a block diagram of the shift and data overflow detection system according to the invention;

FIGS. 5 and 6 are circuit diagrams of the high order and low order bit positions, respectively of the switching mechanism shown generally in FIGS. 4A and B;

FIG. 7 is a circuit diagram of intermediate switching mechanisms separated by 4 bit positions shown generally in FIGS. 4A and 4B;

FIG. 8 is the data overflow detection circuit which is shown generally in FIGS. 4A and 4B;

FIGS. 9, 10, and 11 are block diagrams teaching the function of the data overflow detection circuit of FIG. 8;

FIG. 12 is a block diagram of the decoder utilized for providing the level 1 switching mechanism control signals;

FIG. 13 is a block diagram of the decoder utilized for providing the level 2 switching mechanism control signals; and FIGS. 14A and 14B taken together as shown in FIG. 14, comprise a general block diagram of a shift and data overflow detection system.

DISCLOSURE OF THE INVENTION

According to the invention, a small data field is shifted into a much larger data field. The width of the switching mechanisms is based on the number of bits in the small data field. Loss of data is determined by ORing the control signals utilized to shift the small data field to the large data field.

BEST MODE OF CARRYING OUT THE INVENTION

The invention is applicable to multiply and floating point applications for an "insert field operation". In this type of operation, a small data field of n bits is inserted into an arbitrary position in a much larger field of (m) (n) bits. For example, a n=16 bit data field is inserted into an arbitrary position in a (m) (n)=(4) (16)=64 bit field. A determination must be made if any of the "1" bits in the first field, that is the 16 bit data field, are shifted out of the second field, that is the 64 bit field. This is done to meet the IEEE floating point standard to determine if, during an overflow any "1" bits are lost, and have to be reinserted.

There are two levels of switching mechanisms utilized in the invention, and the width of the mechanisms is based on the width of the small data field, as opposed to being based on the shift range, that is the width of the second data field.

The determination of whether any data has been lost is made by ORing control signals which represent every 4th data bit, which data bits are identical. The number of INPUTS (which is small) is what allows the shift stages, that is the switches, to all look the same. There is a shift of 16 bits (0-15) into a 64 bit (0-63) field. There are shift amounts from 0..63 (anything more overflows all of the data). Level 2 does the fine shifts, 0,1,2,3, and Level 1 does the coarse-shifts, 0, 4, 8, 12, 16, 20, 24, 28, 32, 36, 40, 44, 48, 52, 56 and 60. That long list looks like a 16-way switch is needed in level 1, because it looks like the typical output of level 1 can come from 16 different places. However, if there is a calculation of exactly where the "typical" Bn comes from, it is IN(n−S1), where S1 signifies the amount that level 1 is shifting. S1 (so defined) has values 0,4,8,12,16,20,....60. so the input bit to be connected to is IN(n), IN(n−4), IN(n−8), IN(n−12), IN(n−16), IN(n−20)...In(n−60). If there is an attempt to find a way to get more than 4 inputs, the attempt fails; the presumed first input will come from a bit position no bigger than 15, i.e., from bit In(15); the second will be from IN(15−4)=IN(11), the third will be from IN(7), the fourth will be from IN(3) and the presumed fifth will come from IN(−1). Now there is no such bit, and normally words are extended with zeros. So the VALUE of bit IN(−1) is 0. But in the structure of the mechanism, a 0 input is equivalent to an open circuit between the output of the stage and its input (or ground for level 1), and the easiest way to get an open circuit is to omit the devices.

Refer now to FIG. 1, which illustrates a 16 bit, 0-15, data field 2 which can be inserted into an arbitrary position and a second data field 4 of 64 bits, 0-63. There are 16 overflow bit positions 64-79. An OR gate 8 detects if there are any "1" bits in the bits 64-79, which is indicative of a loss of data. In this instance, the input data field 2 is inserted in the 0-15 bit positions of data field 4, so it follows that there are all "0"s in bit positions 64-79, and OR gate provides a "0" out which is indicative of no loss of data.

FIG. 2, illustrates the input data field 2 being inserted by a shift of 16 into an intermediate position in the second data field 4. Again, there is no data overflow into bit positions 64 and 79, and OR gate 8 provides a "0" out which is indicative of no loss of data.

FIG. 3, illustrates the input data field 2 having been inserted by a shift of 63, resulting in an overflow into bit positions 64–79 of the overflow data field 6. In this instance, if there is at least one "1" in the overflow data field, this is detected by the OR 8 which provides a "1" out which is indicative of a loss of data.

FIGS. 4A and 4B taken together as shown in FIG. 4 constitute a detailed block diagram of the invention. An input register 2 provides the input data field comprised of bits A0–A15 to the second data field 4 (FIGS. 1-3) which comprises a first level switching mechanisms 10 which shifts data under control of a decoder 12 which provides n=16 control signals, with the data out from the first level switching mechanisms 10 being provided to a second level switching mechanism 14 which is controlled by m=4 control signals provided by a decoder 16.

The first level switching mechanism 10 includes input data switches $S_1 0$–$S_1 67$, which have m control inputs for selecting a single output from each switch. The switches $S_1 0$–$S_1 63$ comprise the (m) (n) second data field 4, and the m switches $S_1 64$–$S_1 68$ comprise the overflow data field 6. The second level switching mechanism 14 includes (m).(n) input data switches $S_2 0$–$S_2 64$, which have m control inputs for selecting a single data output. The (m) (n) switches $S_2 0$–$S_2 63$ receive predetermined data inputs from switches $S_1 0$–$S_1 63$ of mechanism 10. The single overflow switch $S_2 64$ receives data inputs from switches $S_1 61$–$S_1 67$ of mechanism 10 and provides an indication of whether or not there is a loss of data whenever an overflow exists. That is, a "1" is provided at the output of $S_2 64$ whenever a "1" data bit overflows in the first level mechanism 10. This is described in detail below.

The first and second level mechanisms 10 and 14 are comprised of 4 way switches at each switch position since the shift range is based on the input, i.e. 16 bits as opposed to the output, i.e. 64 bits. This results in the utilization of fewer transistors in each of the switches in each of the first and second level mechanisms.

It is seen that every mth, that is 4th switch in the first level mechanism 10 has identical data inputs, but different control inputs. This is seen in more detail with respect to FIG. 7, the operation of which is explained shortly. For example, $S_1 0$ and $S_1 4$ have the same data inputs, $S_1 1$ and $S_1 5$ have the same data inputs, $S_1 32$ and $S_1 36$ have the same data inputs, and so on up to $S_1 59$ and $S_1 63$ which have the same data inputs. This repetition of data, with different control signals determines where the input data is inserted in mechanism 10. Decoder 12 provides control signals $C_1 0$ through $C_1 60$ which control the input of data into switches $S_1 0$–$S_1 63$, with control signals $C_1 52$–$C_1 60$ also controlling the input of data to switches $S_1 64$–$S_1 67$. The ORing of the control signals that represents every 4th data bit in the switches $S_1 64$–$S_1 67$ detects the loss of data. This is explained in detail shortly, relative to FIG. 8.

The two levels of mechanisms 10 and 14 provides a shift of 0–63. In level 1 there is a shift/rotate of 0–60 in 4 bit increments, and in level 2 there is a shift of 0–3 in 1 bit increments. For example, if there is a shift of 0, control signals $C_1 0$ and $C_2 0$ would be on and A0–$A_1 15$ would appear at OUT 0–OUT 15. If there were to be a shift of 5, control signals $C_1 4$ and $C_2 1$ would be on, and A0–A15 would appear at OUT 5–OUT 20 and so on up to a shift of 63, where control signals $C_1 60$ and $C_2 3$ would be on, and A0 would appear at OUT 63, and OUT 64 would indicate if there were an overflow of a "1" from A1–A15. This is explained in detail below.

FIG. 5 details operation of a typical 2 level switch, in particular that comprised of switch $S_1 63$ of mechanism 10 and $S_2 63$ of mechanism 12. The switches utilized in the invention are shown as being comprised by MOS transistors, but it is to be appreciated that they could be comprised of other switching devices such as bipolar transistors, relays, photo-conductors controlled by LED'S or the like. This 2 level switch will be providing bit 63 in the output word. Thus it is connected to data inputs $A_i$ and stage 1 control lines $C_1 j$ such that $i=63-j$. For the bit shown (bit 63) this results in input bits $A_3$, $A_7$, $A_{11}$ and $A_{15}$ which are selected by control lines $C_1 60$, $C_1 56$, $C_1 52$, and $C_1 48$, respectively. This selection is provided by a set of NMOS transistors 46,48,50,52,54,56,58 and 60. Sources of NMOS transistors 46,48,50 and 52 are connected to ground, and the gates of these same transistors are connected to the data inputs, $A_3$, $A_7$, $A_{11}$ and $A_{15}$ respectively. Sources of NMOS transistors 54,56,58 and 60 are connected to drains of NMOS transistors 46,48,50 and 52 respectively, and gates of NMOS transistors 54,56,58 and 60 are connected to control lines $C_1 60$, $C_1 56$, $C_1 52$ and $C_1 48$, respectively. Drains of NMOS transistors 54,56,58 and 60 are connected in common, and constitute the output B63 of the first level switch.

The second level switch is similarly connected, with principal differences arising from the different control line functions. Level 2 provides for shift amounts of 0,1,2,3 depending upon which of $C_2 0$, $C_2 1$, $C_2 2$ or $C_2 3$ is on, respectively. Thus, $S_2 63$ will receive inputs from $S_1(63-n)$ where n is (0..3). The switching in this stage is provided by 4 NMOS transistors 62,64,66,68 with gates connected to control lines $C_2 3$, $C_2 2$, $C_2 1$ and $C_2 0$, respectively, and sources connected to first stage outputs B60, B61, B62 and B63, respectively. Drains of NMOS transistors 62,64,66,68 are tied together to the drain of PMOS transistor 70, whose source is tied to supply $V_{DD}$ and whose gate is tied to ground. The output is provided through an inverter 72, whose input is taken from the drain of PMOS device 70. It will be noted that PMOS device 70 is always turned on. In the absence of any conducting path through the switch devices 62,64,66,68 of level 2, and devices 54, 56, 58, 60 of level 1, or input devices 46, 48, 50, 52 of level 1 (and similar level 1 switch and input devices from B62,B61 and B60), the PMOS device 70 will hold the input of inverter 62 at a high level, thus providing a 0 output at OUT63. When such a conducting path exists, it will dominate over the PMOS device 70, and thus the inverter input will be pulled down, providing a 1 output at OUT63. The switching network described is such that for a shift amount of n, the conducting path will exist only if input data $A_{(63-n)}$ is high; thus the output data will be identical to $A_{(63-n)}$. As an example, consider the case for n=56. In this case, control lines $C_1 56$ and $C_2 0$ will be on, turning on devices 68 and 56. The input to the inverter 72 is thus controlled by $A_7$, and the output from OUT63 will have the same value as $A_7$.

FIG. 6 illustrates the same switch arrangement for producing OUT0. As before, the level 2 switches select a level 1 input Bn where n is the output bit position (here 0) minus the shift amount (here 0,1,2,3). For all shift amounts except 0 (selected by $C_20$), this input does not exist, and, by the usual extension applied, is 0. Since, in this shifter, the effect of a zero input is to provide a non conducting path, the level 2 switches in this case are simply grounded in source and gate (devices 34,36 and 38). Similarly, in level 1, switch paths controlled by any control other than $C_10$ receive data from non-existent bits ($A_{(-4)}$, $A_{(-8)}$...); the gates of these switches (28,30,32) are therefore grounded, while the sources and input devices (18,20,22,24) remain connected normally.

FIG. 7 details two intermediate switches $S_132$ and $S_136$ of mechanisms 10 and $S_232$ and $S_236$ of mechanism 14. These switches operate in a manner similar to the operation described for the switches shown in FIGS. 5 and 6. It is to be noted that switches $S_132$ and $S_136$ are displaced from one another by 4 bit positions and have identical data inputs, A0, A4, A8 and A12 and different controls. $C_132$, $C_128$, $C_124$ and $C_120$ control $S_132$, and $C_136$, $C_132$, $C_128$ and $C_124$ control $S_136$.

FIG. 8 details the switches $S_164$, $S_165$, $S_166$ and $S_167$ of the overflow field of mechanism 10, and overflow switch $S_264$ of mechanism 12, which operate to effectively OR the control signals that represent every 4th data bit to determine if any data is lost if there is a overflow. That is, there is a determination of whether or not there is a "1" bit in any of the bits that overflowed into switches $S_164$ $S_167$.

It will be noted from the earlier discussion, that for the level 1 switches, every 4th 4-way switch shares the same four data lines. Thus, $S_10$ has data inputs A0, A4, A8 and A12, $S_14$ has data input lines A0, A4, A8 and A12, and in general $S_14n$ will have these same inputs. This fact is utilized in reducing the hardware required to detect overflow of data (the attempt to shift of one or more non-zero bits into the output positions 64–79.) The structure of FIG. 8 (which includes ORing together any non-zero bits that would be shifted into positions 64–79 into a single "overflow" bit (0ut64)) can be best understood by reference to FIG. 9. FIG. 9 represents the extension of the shift structure thus far described as if it were to include all bits including OUT65–OUT79. Note that this figure is explanatory only; under this invention these bits are not actually produced.

In FIG. 9, $S_164$ is shown with its proper control wires and data input bits. Note that device 76 has its gate connected to ground, as the path controlled by devices 74 and 76 is active only for a shift of 64, which never occurs. Similarly, the $S_168$ devices 150 and 152 have their gates connected to ground, as the paths containing these devices is only active for shift amounts of 68 or 64 respectively, both of which never occur. In determining the overflow condition, it is only required to determine that a non-zero bit was shifted into the overflow region 64–79. This is most easily done by wiring the output B64 directly to the output B68 as shown in FIG. 9, B72 and B76, not shown; the path from this merged node (which shall continue to referred to as B64) will conduct current to ground if any non-zero bit is shifted by stage one into either position 64 or position 68 or position 72 or position 76.

Because the four inputs of the switches $S_164$ and $S_168$ are common, the input devices may be shared as indicated in FIG. 10. This circuit performs the identical function as that of FIG. 9, but eliminates the circuitry of $S_168$, $S_172$ and $S_176$. To accomplish this, it requires a more complex switch structure; specifically, each switch (items 76,80,80,88)) has become 2 paralleled devices, to provide for the fact that the corresponding path must be closed under two control conditions. The irregularity in physical structure implicit in this can be eliminated by the structure of FIG. 11. Here, the two parallel control switches of FIG. 10 have been eliminated in all places by a single switch whose value is the proper multiple control condition. The cost implicit in this is the generation of a few more control lines. It should be noted that in FIG. 11, the extra control wires could be generated as literal OR's of pre-existing controls, or as additional decoder outputs.

The remaining switches $S_165$, $S_166$ and $S_167$ of FIG. 8 operate in the same way described above, with appropriate differences for the different data bits encountered. The resulting structure consists of 4 4-way switches constructed as described above, whose output is "wire-ored" into a single signal B64, which reflect whether or not the stage 1 switches have shifted any non-zero bits into positions 64..79 of the output word, without having to generate any positions beyond 67.

$S_264$ operates in a similar manner to OR into OUT64 data shifted into the overflow region (64–79) from stage 1 (device 100, always on), or data shifting in stage 2 into the overflow region from B61 or B62 or B63 with controls, ORed together to obtain the proper action; thus, non-zero data will propagate from B62 into the overflow region if the stage two shifter is shifting by 2 or 3 bits ($C_22$ or $C_23$).

All 16 input data bits $A_{0-A15}$ are tested to determine if there is a "1" in the overflow. $S_164$ has data inputs of $A_0$, $A_4$, $A_8$ and $A_{12}$; $S_165$ has data inputs of $A_1$, $A_5$, $A_9$ and $A_{13}$; $S_166$ has data inputs of $A_2$, $A_6$, $A_{10}$ and $A_{14}$; and $S_167$ has data inputs of $A_3$, $A_7$, $A_{11}$ and $A_{15}$. Each switch is controlled by $C_152$, $C_156$ and $C_160$ to perform the determination. The operation of $S_164$ is described, with the understanding that $S_165$, $S_166$ and $S_167$ operate in a like manner.

$S_164$ is comprised of NMOS transistors 74, 76, 78, 80, 82, 84, 86 and 88. The source electrodes of transistors 74, 78, 82 and 86 are connected to ground, and their gate electrodes are connected to $A_0$, $A_4$, $A_8$ and $A_{12}$, respectively. The drain electrodes of these transistors are connected to the source electrodes of transistors 76, 80, 84 and 88, respectively. The gate electrode of transistor 76 is connected to ground, and the gate electrode of transistor 80 is connected to $C_160$. An OR gate 90 has inputs of $C_156$ and $C_160$, with an output of $C_156$ or $C_160$ being applied to the gate electrode of transistor 84. An OR gate 92 has inputs of $C_152$, $C_156$ and $C_160$, with an output of $C_152$ or $C_156$ or $C_160$ being applied to the gate electrode of transistor 88. The stack of transistors 74 and 76 is always in an off condition, since the gate electrode of transistor 76 is connected to ground. The stack of transistors 78 and 80 is on only if $C_160$ is on at the gate of transistor 80 and $A_4$ is on at transistor 78 which is indicative of an overflow of a "1" at bit position $A_4$. In this instance the ground connection at the source electrode of transistor 78 is passed through conducting transistor 78 and 80 to B64. The stack of transistors 82 and 84 is on only if $C_156$ or $C_160$ is on at the gate of transistor 84, and $A_8$ is on at the gate of transistor 82 which is indicative of an overflow of a "1" at bit position $A_8$. In this instance the ground connection at the source electrode of transistor 82 is passed through conducting transistors 82 and 84 to B64. The stack of transistors 86 and 88 is on only if, $C_152$ or $C_156$ or $C_160$ is on at the gate of transistor 88, and $A_{12}$ is on at the gate of transistor 86 which is indicative of an overflow of a "1" at bit position $A_{12}$. In this instance the ground connection at the source electrode of transistor 86 is passed through conducting transistors 86 and 88 to B64. It is seen that any time a ground potential is applied to B64 from a conducting stack of transistors in either of $S_164$, $S_165$, $S_166$ or $S_167$, this is indicative of a "1" in one of the input data bits $A_0$-$A_{15}$ has overflowed and this bit of data has been lost.

$S_264$ is comprised of NMOS transistors 94, 96, 98 and 100; a PMOS transistor 102; an inverter 104 and OR gates 106 and 108. Transistor 102 is biased on since its gate electrode is connected to ground and its source electrode is connected to $V_{DD}$. $V_{DD}$ is inverted by inverter 104 and the "0" out at OUT64 is indicative of no lost data. Transistor 100 has its gate electrode connected to $V_{\overline{DD}}$ and its source electrode connected to B64, the output from $S_164$ or $S_165$ or $S_166$ or $S_167$. If B64 is at a potential above ground, indicative of no loss of a "1" data bit, transistor 100 is biased off. On the other hand if B64 is at ground potential which is indicative of a lost "1" data bit, transistor 100 is turned on and the ground potential is applied to the drain electrode of transistor 102, biasing this transistor off, and inverter 104 inverts the ground potential to a "1" which is indicative of a lost data bit at OUT64.

The source electrodes of transistors 94, 96 and 98 are connected to B61, B62 and B63, respectively, which are the outputs of $S_161$, $S_162$ and $S_163$ (FIG. 4A), respectively. The gate electrode at transistor 94 is connected to $C_23$. The OR gate 106 has inputs of $C_22$ and $C_23$ and provides an output of $C_22$ or $C_23$ to the gate electrode of transistor 98. The OR gate 108 has inputs $C_21$, $C_22$ and $C_23$ and provides an output of $C_21$ or $C_22$ or $C_23$ to the gate electrode of transistor 98. If any of the data inputs B61, B62 or B63 are at ground potential and the control signal for the associated transistor is on, this is indicative of a lost "1" data bit, and the associated transistor is turned on and the ground potential is inverted by inverter 104 to provide a "1" at OUT64 which is indicative of a lost "1" data bit.

FIGS. 12 and 13 illustrate how scale factor signals $S_0$, $S_1$, $S_2$, $S_3$, $S_4$ and $S_5$ are partially decoded by first and second decoders to provide first and second groups of control signals for controlling the amount of shift or rotate in the mechanisms 10 and 14, respectively. The first decoder decodes scale factor signals $S_2$, $S_3$, $S_4$ and $S_5$ to provide the first set of n=16 control signals $C_10$, $C_14$, $C_18$–$C_156$ and $C_160$ for controlling the amount of shift or rotate in mechanism 10 at level 1. The second decoder decodes scale factor signals $S_0$ and $S_1$ to provide the second set of m=4 control signals $C_20$, $C_21$, $C_22$ and $C_23$ for controlling the amount of shift or rotate in mechanism 14 at level 2. The total shift or rotate is the sum of the shift or rotate produced in mechanism 10 at level 1 and mechanism 14 at level 2. Mechanism 10 could be at level 2 and mechanism 14 at level 1. In any event, the total amount of shift is the sum of the rotate from each mechanism.

FIG. 12 illustrates the first decoder 12 which partially decodes the scale factor signals by decoding $S_2$, $S_3$, $S_4$ and $S_5$. The complements of these signals are provided by inverters 110, 112, 114, 116 and 118, respectively. The codes produced by $S_2$, $S_3$, $S_4$ and $S_5$ are decoded by AND gates 118, 120, 122, 124 and 126 for producing control signals $C_10$, $C_14$, $C_18$, $C_156$ and $C_160$, respectively. The AND gates utilized for producing control signals $C_112$, $C_116$, $C_120$, $C_124$, $C_128$, $C_132$ etc through $C_152$ are not shown as their implementation is straight forward.

FIG. 13 illustrates the second decoder 16 which partially decodes the scale factor signals by decoding $S_0$ and $S_1$. The complements of these signals are provided by inverters 128 and 130 respectively. The codes produced by $S_0$ and $S_1$ are decoded by AND gates 132, 134, 136 and 138 to provide the second group of control signals $C_20$, $C_21$, $C_22$ and $C_23$ for controlling the amount of shift or rotate in mechanism 14 at level 2.

The shifter has been described above in terms of a minimum shift size of one bit position. The basic concepts of this invention can be generalized and extended to the case in which the minimum shift size is some power of 2, i.e., $2^c$. In this case the shift is envisioned as a number to be divided into three sub-fields; "a" most significant bits, "b" middle bits and "c" least significant bits. This extension is illustrated in FIGS. 14A and 14B, which is similar to FIG. 4 except that all shift amounts are multiplied by 2c.

As it can be seen in FIGS. 14A and 14B a low order shift distance code (c) can be appended, and the structure can operate as a $2^c$ base shifter. This $2^c$ shift activity can be performed by a bit level shifter and will not be discussed here.

The shift amount provided in each level has been multiplied by $2^c$. In particular, the data input to $S_{1q}$ are $I(q)$, $I(q-2^{b+c})$, $I(q-2.2^{b+c})$, $I(q=3.2^{b+c})$. As in the previous description, only the datum in the range $0..M-1$ have inputs in the switching mechanism. The number of OR circuits is limited to the smaller of n and $2^{b+c}$. Similarly the width of the first level switches is limited to the smaller of $2^a$ and the least upper bound of $(n/2^{b+c})$. Level 2 is similarly modified to include for $S_{2q}$: $S_{1q}$, $S_1(q-2^c)$, $S_1(q-2.2^c)$, $S_1(q-3.2^c)$.

The overflow switches (in the 1st level, $S_1m..S_1m+2^{b+c}-1$ and in the second stage $S_2m..S_2m+2^c$) are modified from the simple shifter form by ORing inputs, and outputs and/or control lines in the manner shown in FIGS. 8–11 with suitable adjustments for greater shift distances.

Having thus described our invention, what we claim as new, and desire to secure by Letters Patent is:

1. In a shift circuit, apparatus for determining if there is a loss of data when shifting a first data field of n bits into a second field of (m).(n) bits, where m is an integer $\geq 2$, comprising:

means for decoding s, where s is an integer, scale factor signals, to provide m control signals indicative of a first amount of shift, and n control signals indicative of a second amount of shift, with the sum of the amounts specified by said m and n control signals specifying the total amount of shift for said circuit;

(m).(n) data switches at a first switching level, with each such switch having m data inputs for receiving predetermined input bits of said first data field, and m control inputs for receiving predetermined ones of said n control signals for selecting one of said predetermined inputs bits as an output of said each such switch;

m overflow switches at said first switching level, with each such switch having m data inputs for receiving predetermined input bits of said first data field, with an output of each overflow switch being connected together to form a single output, with m control inputs for receiving predetermined ones of one or more of said n control signals for testing if any of said predetermined input bits is in a predetermined state and if so providing an overflow indication to said single output;

(m).(n) data switches at a second switching level, with each such switch having m data inputs for receiving predetermined outputs from said data switches at said first switching level, and m control inputs for receiving predetermined ones of said m control signals for selecting one of said predetermined outputs from said data switches at said first switching level as an output of said each such switch; and one overflow switch at said second switching level, having m data inputs, with one data input connected to the single output of said m overflow switches and the other (m−1) data inputs being connected to receive predetermined outputs from said data switches at said first switching level, and m control inputs for receiving predetermined ones of one or more of said m control signals for testing if any of said (m−) inputs is in said predetermined state, or if said one data input has an overflow indication, and if so, providing an overflow bit at an output of said one overflow switch.

2. The combination claimed in claim 1, wherein every mth data switch at said first switching level has identical data inputs from said first data field.

3. In a shift circuit, apparatus for determining if there is a loss of data when shifting a first data field of n bits into a second field of (m).(n) bits, where m is an integer ≧2 comprising:

means for decoding s, where s is an integer, scale factor signals, to provide m control signals indicative of a first magnitude of shift, and n control signals indicative of a second magnitude of shift, with the sum of the magnitudes specified by said m and n control signals specifying the total magnitude of shift for said circuit;

(m).(n) data switches at a first switching level, with each such switch having m data inputs for receiving predetermined input bits of said first data field, and m control inputs for receiving predetermined ones of said n control signals for selecting one of said predetermined input bits as an output of said each such switch, with every mth switch having identical data inputs and different control inputs;

m overflow switches at said first switching level, with each such switch having m data inputs for receiving predetermined input bits of said first data field, with an output of each overflow switch being connected together to form a single output, with m control inputs for receiving predetermined ones of one or more of said n control signals for testing if any of said predetermined input bits is in a predetermined state, and if so providing an overflow indication to said single output, with each of said m overflow switches having one control input which does not receive any control inputs so that one of said predetermined input bits is not tested at each such overflow switch;

(m).(n) data switches at a second switching level, with each such switch having m data inputs for receiving predetermined outputs from said data switches at said first switching level, and m control inputs for receiving predetermined ones of said m control signals for selecting one of said predetermined outputs from said data switches at said first switching level as an output of said each such switch; and one overflow switch at said second switching level, having m data inputs, with one data input connected to the single output of said m overflow switches and the other (m−1) data inputs being connected to receive the (m).(n), (m).(n)−1,-(m).(n)−(m−1) outputs from said data switches at said first switching level, and m control inputs for receiving predetermined ones of one or more of said m control signals for testing if any of said (m−1) inputs is in said predetermined state, or if said one data input has an overflow indication, and if so, providing an overflow bit at an output of said one overflow switch.

4. In a shift circuit, apparatus for determining if there is a loss of data when shifting a first data field of n bits into a second field of m bits, where m is an integer $>n$, comprising:

means for decoding b, where b is an integer, scale factor signals, to provide $2^b$ control signals indicative of a first amount of shift in the range of (0. . . $2^b-1$);

means for decoding a, where a is an integer, scale factor signals, to provide $2^a$ control signals indicative of a second amount of shift in the range of (0 . . . $(2^a-1).2^b$);

m data switches at a first switching level, with each such switch having i, where i is smaller than $2^a$ or the least upper bound of $(n/2^b)$, data inputs for receiving predetermined input bits of said first data field, and i control inputs for receiving predetermined ones of said $2^a$ control signals for selecting one of said predetermined input bits as an output of said each such switch;

$2^b$ overflow switches at said first switching level, with each such switch having i data inputs for receiving predetermined input bits of said first data field, with an output of each overflow switch being connected together to form a single output, with i control inputs for receiving predetermined ones of one or more of said $2^a$ control signals for testing if any of said predetermined input bits is in a predetermined state, and if so providing an overflow indication to said single output;

m data switches at a second switching level, with each such switch having $2^b$ data inputs for receiving predetermined outputs from said data switches at said first switching level, and $2^b$ control inputs for receiving predetermined ones of $2^b$ control signals for selecting one of said predetermined outputs from said data switches at said first switching level as an output of said each such switch; and one overflow switch at said second switching level, having $2^b$ data inputs, with one data input connected to the single output of said $2^b$ first switching level overflow switches and the other $(2^b-1)$ data inputs being connected to receive predetermined outputs from said data switches at said first switching level, and $2^b$ control inputs for receiving predetermined ones of one or more of said $2^b$ control signals for testing if any of said $(2^b-1)$ inputs is in said predetermined state, or if said one data input has an overflow indication, and if so, providing an overflow bit at an output of said one overflow switch.

5. The combination claimed in claim 4, wherein every $2^{bth}$ data switch at said first switching level has identical data inputs from said first data field.

6. A shift circuit which shifts a first data field of n bits into a second field of m bits, where m is an integer $>n$, comprising:

means for deciding b, where b is an integer, scale factor signals, to provide $2^b$ control signals indicative of a first amount of shift in the range of $(0 \ldots 2^b-1)$;

means for decoding a, where a is an integer, scale factor signals, to provide $2^a$ control signals indicative of a second amount of shift in the range of $(0 \ldots (2^a-1).2^b)$;

m data switches at a first switching level, with each such switch having i, where i is smaller than $2^a$ or the least upper bound of $(n/2^b)$, data inputs for receiving predetermined input bits of said first data field, and i control inputs for receiving predetermined ones of said $2^a$ control signals for selecting one of said predetermined input bits as an output of said each such switch; and m data switches at a second switching level, with each such switch having $2^b$ data inputs for receiving predetermined outputs from said data switches at said first switching level, and $2^b$ control inputs for receiving predetermined ones of said $2^b$ control signals for selecting one of said predetermined outputs from said data switches at said first switching level as an output of said each such switch.

* * * * *